United States Patent [19]

Uhlig

[11] 4,372,525
[45] Feb. 8, 1983

[54] INSOLE, APPARATUS FOR MOLDING AND METHOD OF MAKING SHOES

[76] Inventor: Curtis A. Uhlig, P.O. Box 4412, Harrisburg, Pa. 17111

[21] Appl. No.: 156,804

[22] Filed: Jun. 5, 1980

[51] Int. Cl.³ .............................................. B29C 1/02
[52] U.S. Cl. .................................. 249/102; 249/160; 425/129 S; 425/192 R
[58] Field of Search .................. 425/129 S, 192 R; 264/244; 249/102, 160

[56] References Cited

U.S. PATENT DOCUMENTS 3,724,803  4/1973  Goldfard .......................... 249/160 X

*Primary Examiner*—Thomas P. Pavelko
*Attorney, Agent, or Firm*—Allan Redrow

[57] ABSTRACT

An apparatus is provided for precision forming plastic insoles for use in the mass production of shoes. An injection mold structure is shown and a method of assembling the finished insole together with a unit sole structure is described.

5 Claims, 12 Drawing Figures

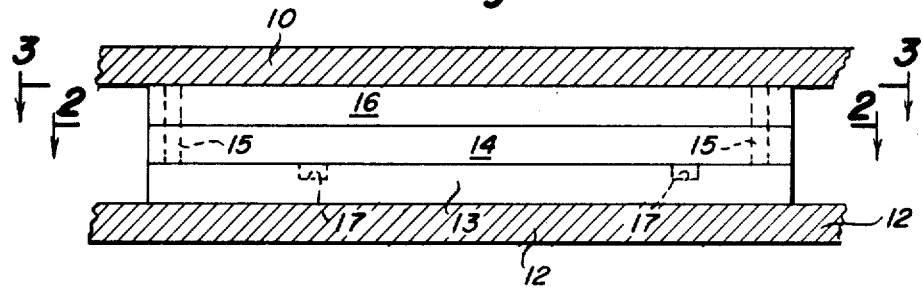
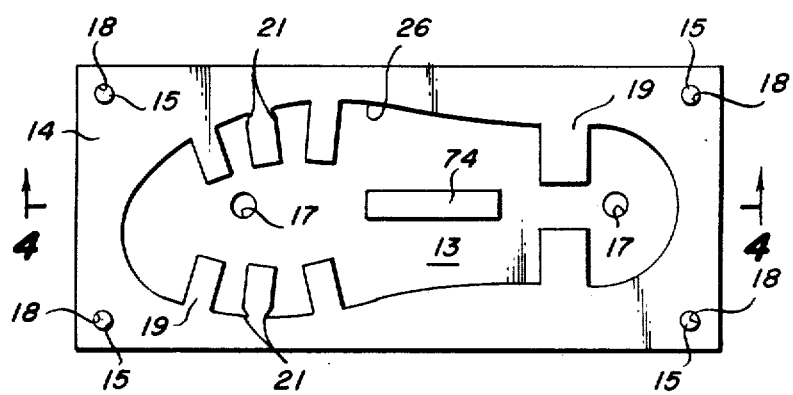
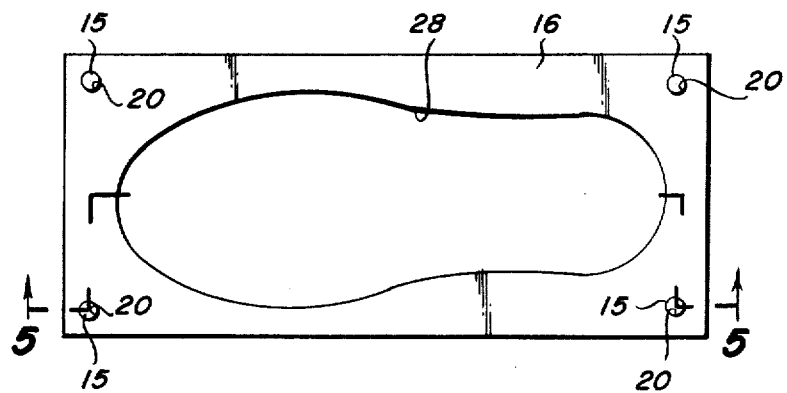
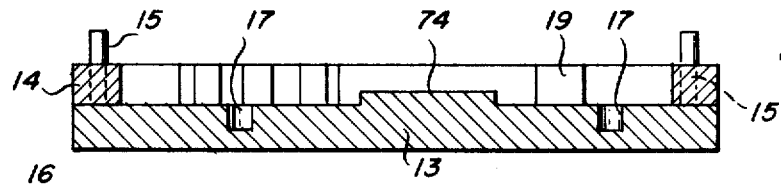
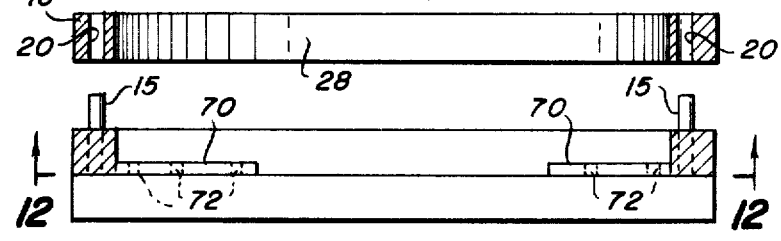
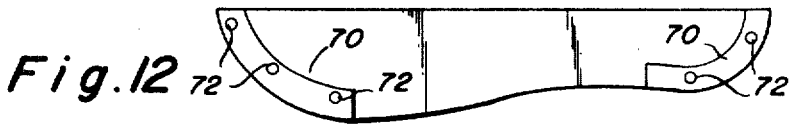

Fig.6
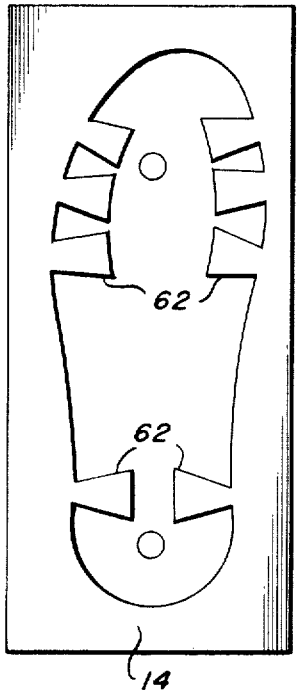
Fig.7
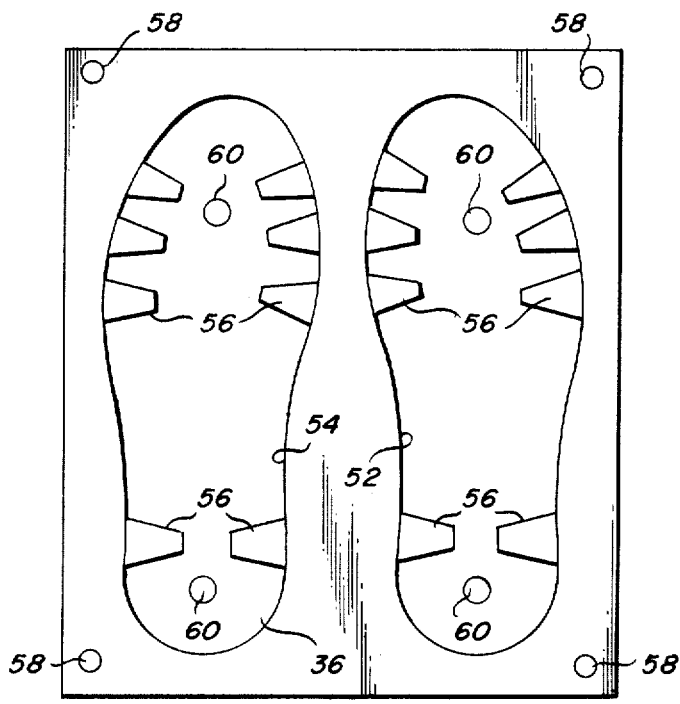
Fig.8
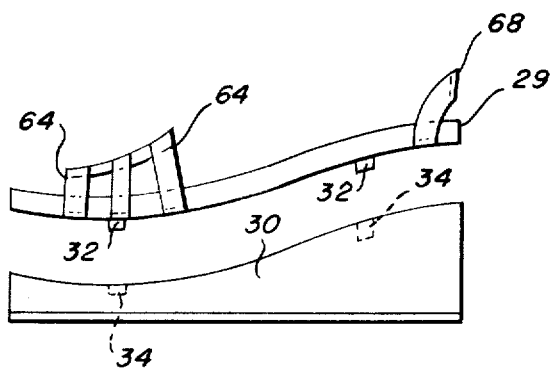
Fig.9
Fig.10
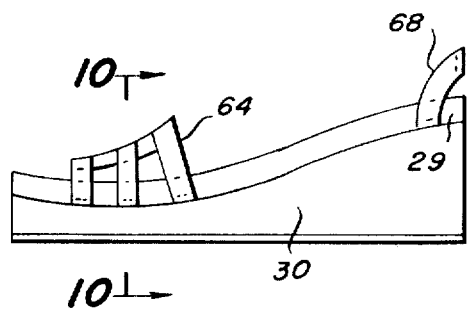
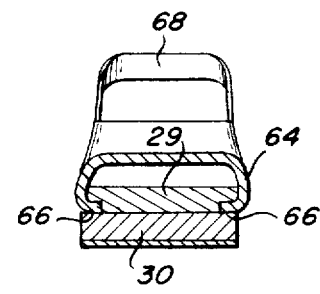

INSOLE, APPARATUS FOR MOLDING AND METHOD OF MAKING SHOES

PRIOR ART

Various procedures have been used for making and assembling shoes and in certain types of constructions, an insole is fabricated, heel and vamp straps are sewn or stapled thereto and this composite assembly is glued to a unit sole means. In other methods of assembling shoes, elements are lasted over a form and are tacked to be held in place while sole means are attached thereto in various ways.

Examples of some of the known ways of fabricating shoes are shown in the U.S. Pat. Nos. to Fern, 2,431,898, Dec. 2, 1947; Keen et al., 2,786,237, Mar. 26, 1957; Dawn et al., 3,611,501, Oct. 12, 1971 and Haizinger, May 24, 1977.

BRIEF DESCRIPTION OF THIS INVENTION

The method of injection molding an insole that forms the subject of this disclosure provides an insole design that eliminates the need for a filler piece, requires neither lasting nor stitching for attachment of the vamp and heel straps to the insole. The insole is molded with notches in its underside that are shaped to receive the ends of the vamp and heel straps, the notches being sized for a precision interfit with the strap ends so that a quick and efficient subassembly of the straps to the insole can be effected and then the subassembly can be glued to the top of a previously formed unit sole structure to complete a shoe.

The invention includes the showing of a simplified injection mold structure made by assembling two apertured mold sheets together with a base plate between the platens of a conventional injection mold wherein the apertures in the mold sheets combine to form the mold cavity to be filled to form the insole. The apertures in the mold sheets are adapted to be easily cut in the respective sheets with simple machining steps for making the two sheets that are then placed side by side on the base plate to provide the mold cavity.

Another feature of the use of the two sheets involves the manner of using them between the platens in a manner that makes it possible to fabricate insoles for use with the unit sole structures for the right and left feet. The two apertured sheets may be used to produce insoles for left shoes and then each plate is turned over and assembled on the base plate to form the mold for right hand insoles.

It is therefore an object of this invention to provide an improved method of manufacturing insoles and assembling the insoles with the unit sole structure.

Another object is to produce an integral insole for receiving the ends of vamp and heel straps without requiring a separate filler piece.

Another object of this invention is to provide an insole having notches that have a precision fit with the ends of the vamp and heel straps to facilitate assembly of the straps with the insole.

Another object is to produce an insole having notches with pins integral with the notches to receive leather or other flexible toe and heel pieces having matching holes punched therein for interfitting with the pins.

Another object is to provide a more efficient assembly procedure for mass producing shoes.

Other objects will appear from the specification below.

IN THE DRAWINGS

FIG. 1 is a side elevation of the apertured mold sheets and base plate assembled between the platens of an injection molding press;

FIG. 2 is a plan view looking at the bottom mold sheet assembled on the base plate of the injection mold looking on the plane 2—2 of FIG. 1;

FIG. 3 is a plan view of the upper mold sheet assembled on top of the bottom mold plate looking on the plane 3—3 of FIG. 1;

FIG. 4 is a sectional elevation of the bottom mold sheet and base plate of FIG. 2 taken on the plane 4—4 of FIG. 2;

FIG. 5 is a sectional elevation of the upper mold sheet taken on plate 5—5 of FIG. 3;

FIG. 6 is a plan view of an alternate form of bottom mold sheet mounted on the base plate such as is shown in FIG. 2 with modified dovetail shaped lands for anchoring the ends of the vamp straps to the finished insole;

FIG. 7 is a plan view of another modification of a mold structure showing that left and right handed shoe insoles may be made simultaneously;

FIG. 8 is an exploded view showing a molded insole having vamp means and a heel embracing means assembled on a molded insole;

FIG. 9 is a side elevation of a completed shoe showing the insole, vamp and heel embracing means adhered to the upper surface of a previously made unit sole structure;

FIG. 10 is a sectional view looking at the plane indicated by line 10—10 of FIG. 9;

FIG. 11 is a view of an alternate form of bottom mold sheet taken on plane 4—4 of FIG. 2; and FIG. 12 is a view taken on plane 12—12 of FIG. 11.

DETAILED DESCRIPTION

The injection mold means adapted to be used in making insoles in accordance with this invention, makes use of a conventional mold having platens 10 and 12 for mounting in an injection molding press as is well known. The platens reciprocate relatively toward and away from each other, the platen 12 usually being stationary, and the platens are pressed together with sufficient pressure to contain the fluid resin that is forced under pressure into the cavity of the mold mounted between the platens. The resin remains in the mold until it solidifies.

The mold means preferably includes a base plate 13 and two apertured mold sheets 14 and 16 mounted on the base plate. The base plate 13 has mounting pins 15 integral therewith and has two blind holes 17 in its upper surface. Mold sheet 14, as shown, has a thickness equal to approximately one half the thickness of the insole to be produced and has precisely positioned holes 18 adapted to receive pins 15 integral with the base plate 13 for precisely locating the position of mold sheet 14 relative to the base plate. The upper mold sheet 16 is provided with precisely positioned holes 20 fitting over pins 15 for precisely locating upper mold sheet 16 over the bottom mold sheet 14. When platens 10 and 12 are moved into the closed position in the injection press, it is apparent that the mold sheets mounted on base plate 13 are compressed therebetween to contain the resin injected under pressure in the mold cavity.

Bottom mold sheet 14 is provided with a contoured aperture 26, as shown in FIG. 2 which, for example, represents the shape of a shoe for the left foot of a person. Upper mold sheet 16 is similarly provided with an aperture 28 that exactly matches the contour of aperture 26 so that when the plates are assembled together on base plate 13 due to the precise mounting of sheets 14 and 16 on pins 15, the desired cavity for molding an insole for the left shoe is formed. The resulting cavity has an exact size and shape to fit a previously formed unit sole 30, shown in FIGS. 8 and 9, for which it has been designed. The aperture 26 in the bottom mold sheet 14 matches the contour of the aperture 28 in upper mold sheet 16 but in addition, the bottom mold sheet has lands 19 thereon designed to produce notches in the final insole that are provided to receive the ends of vamp straps or fitted uppers, as will appear more fully below. Blind holes 17 are provided in the face of base plate 13 located in a precise relationship with respect to pins 15 and the shape of apertures 26 and 28.

When the mold sheets described above, are assembled on the base plate and are pressed together in the injection mold, a mold cavity is provided between the platens as defined by the contours of the apertures 26 and 28 of mold sheets 14 and 16. A conventionally used resin may be injected into this cavity in a known manner through a channel, not shown, to fill the cavity in which it is retained until cured. The mold may then be opened and a finished insole 29, for example, to fit the left sole structure of a pair of shoes of a particular size, may be removed from the open mold. A run can be made to complete a given number of left insole parts of that size and shape and then the mold is set up to produce a corresponding number of right hand insole parts.

To produce the right hand insole shapes, the mold sheets 14 and 16 are removed from pins 15 and each is turned over and reassembled on base plate 13. Depending upon the shape of the left insole as compared with the shape of the right insole, it may be necessary to provide additional holes 18 to cooperate with locating pins 15 to cause holes 17 to be precisely positioned in exactly the same relative positions in the mold cavities for the right and left insole mold cavities. When the sheets 14 and 16 are each turned over and reassembled on the base plate 13, it is seen that now an insole can be produced to fit the right handed shoe to complete a pair of insoles. The contour of the aperture in insole sheet 14 has thus been reversed and likewise the contour of the aperture in mold sheet 16 has been reversed and by this procedure, the respective positions of lands 19 have also been reversed and the precision mounting provided by the pins 15 on the base plate enables the operator to use the same two mold sheets for producing both right and left hand insole shapes to form a pair of insoles of identical shape and size but adapted to fit the previously formed right and left hand unit sole structures to complete a pair of shoes. The holes 17 are precisely positioned relative to the pins 15 so that in either the right hand or left hand mode of the production molds, the locating pins 32 formed integral with the molded insole 29, produce a precise interfit with the unit sole structures which have corresponding holes 34 to receive pins 32.

For larger production runs, as shown in FIG. 7, two mold sheets, one top and one bottom, are adapted to be fitted together on a base plate 36. Each mold sheet may be made with two apertures, one in the right hand and one in the left hand configuration. Such plates, when overlaid on the base plate, provide two mold cavities that may be filled simultaneously and with each injection step, a pair of matching left and right insoles can then be made. As seen in the plan view of such a mold means, the base plate is large enough to receive a pair of mold sheets having right hand contoured apertures 52 and left hand contoured apertures 54. A pair of mold sheets fabricated as above described are utilized so that a precision punch cutting, or sawing process may be used to form lands 56 adapted to produce the desired notches in the underside of the finished molded insoles. Precision mounting pins 58 are provided at the four corners of the base plate 36 to position the respective plates precisely with respect to holes 60 which produce locating pins 32 on the molded insoles of the pair of right and left insoles that are produced simultaneously in this mold.

Another modification of a mold sheet is shown in FIG. 6 wherein a bottom mold sheet 14 is shown having generally trapezoidally shaped lands 62 for receiving the similarly precisely shaped ends of the vamp straps and heel supports. When the vamp straps are cut out, their ends are produced to have a trapezoidal shape to just neatly fit in the notches produced by lands 62 and likewise the trapezoidal ends of the heel support straps fit into the notches at the heel end of the molded insole to be embraced and held trapped in the correct position relative to the insole.

Referring to FIGS. 8, 9 and 10, the molded insole 29 produced in either of the insole molds described above, is shown being mated to a unit sole structure 30 and then adhered thereto. The insole is first fitted with vamp strap means 64 that extend over the top of the insole, around its sides to have the ends 66 of individual vamp straps engaged in the notches formed by either lands 19, 56 or 62 as the case may be. With either of land shapes used with the respective insole designs, the ends of the vamp straps can be easily fitted into its notch and cemented in place.

As shown in FIG. 2, certain of the notches 19 may be provided with narrowed mouth portions formed by inwardly pointed projections 21. These projections are designed to interfit with matching notches cut in the edges of the ends of the vamp straps that are fitted into notches 19. Such projections aid in the precision fitting of the ends of the vamp straps with the molded insoles and also preclude the possibility of the straps pulling free from the notch 19 during assembly of the insole on the unit sole or from pulling free from the finished shoe structure.

The trapezoidal shaped notches formed by lands 62 are designed to provide additional support for engaging the ends of the straps to hold them in proper position on the insole.

The notches 70 shown in FIGS. 11 and 12 are designed to receive the turned under edges of leather or other flexible toe vamps. Similar notches at the heel are provided to receive the turned under edge of the heel support. Each of the toe and heel notches 70 are provided with integrally molded nipples 72 that cooperate with precisely punched holes in the vamps. Such cooperating nipple and holes serve to precisely support the vamp means on the molded insole during assembly but also serve to hold the completed shoe assembly together during use in the same manner as the trapezoidally shaped notches shown in FIG. 6 and the projections 21 that may be produced at the mouth of notches 19 if deemed necessary.

The notches formed by the respective lands or notches have a depth to equal the thickness of the straps or toe vamps fitted onto the insole so that the notches are completely filled when the ends of the straps or edges of the vamps are fixed in position on the insoles. The heel supporting means 68 may similarly be fitted to the insole. It is obvious that notches of various lengths on each side or one notch 70 may be produced to engage the ends of the vamp straps or the edge of a single wide vamp on each insole or the edge of a heel engaging means fitted to the insole.

After the insole has been assembled with the vamp means 64 and heel support 68, glue is applied to its underside and preferable a coating of glue is applied to the upper surface of the unit sole structure 30. The insole assembly and sole structure may then be brought together with the locating pins 32 fitted into cooperating apertures 34 in the upper surface of the unit sole. The pins 32 are precisely located during the injection molding operation and are designed to cooperate with holes 34 to cause the molded insoles to fit precisely onto the unit sole means to complete the final assembly of the shoe structure. The insole and sole, after being matched and brought into intimate contact, may then be placed in a suitable press, as is well known, while the adhesive cures.

If desired, a suitable stocking liner may be applied over the finished insole by adhering the liner to the completed shoe. Alternatively, a liner can be fitted into the upper portion of the insole mold cavity before the injection mold is filled so that the liner could be adhered to the molded insole during the molding process.

By making use of the mold described above, it is apparent that an insole structure is provided that can be easily assembled with the vamp strap means for application to a unit sole means. The notches on the underside of the molded insole receive the vamp strap ends to be filled so that a smooth upper surface is automatically produced on the insole thus eliminating the need for filler means as is normally required in such types of shoes. Further, the mold cavity formed by fitting the two mold sheets together produces a relatively complexly shaped insole by utilizing two sheets that have easily produced apertures in the respective sheets. The contours of the apertures in the two sheets can be cut with simple machining techniques but the overlaying of the two sheets produces a cavity with lands that could otherwise only be produced with expensive milling procedures such as would be required if the cavity were to be formed in a mold formed in a solid plate. Lastly, the use of the two mold sheets to form a single mold cavity provides a mold cavity that can be contoured to produce an insole for a right or left shoe of a pair and by a simple reversal of the assembly of the respective sheets on the base plate prior to insertion in the mold press, the use of the same mold sheets makes possible the production of the other shaped insole whereby to provide both the right and left insoles for a pair of shoes with a minimum expenditure for the making of mold sheets. Further, a single upper sheet may be used with several different lower mold sheets having differently shaped lands.

The method of using the structure produced in this mold makes possible the assembly of a molded resin insole with a fabric stocking cover therefor, together with vamp and heel strap means adapted to be assembled on a unit sole without requiring any lasting of the upper to the insole and no stitching is involved. It is possible to construct a completed shoe with a minimum of labor operations with the elimination of the steps as stated above and by utilizing the precisely formed notches on the underside of the insole for assisting in the assembly of the vamps to the insoles, a precise interfit of these parts is made possible without requiring the use of any special skill in completing the precision assembly of all the parts. The end of the straps, for example, are simply placed in the notches which intimately confine these ends and the assembly is completed. Thereafter, the pins 32 are fitted into holes 34 and upon curing of the adhesive, the production of a shoe has been completed.

It is conceivable that the upper platen 10 of the mold press may be provided with a shaped contour on its underside to cooperate with the mold cavity formed by mold sheets 14 and 16. The contour affixed to platen 10 could be shaped to produce a shaped instep support for the foot on the top surface of the insole. Also, additional contoured surfaces affixed to platen 10 could be designed to produce sole conforming heel and toe indentations in the top surface of the molded insole so that it fits the foot more comfortably when assembled on a unit sole. The base plate 13 can also be provided with a centrally disposed land 74, as shown in FIG. 1, to produce a recess in the underside of the molded insole. The recess or cavity so formed is designed to receive a steel arch support shank 76, as shown in FIGS. 8 and 9.

The texture of the molded insole can be selected for comfort to provide a soft bearing or cushion surface for the foot. Also, the bottom surface of the molded insole can be provided with the cavity to receive a steel shank for supporting the instep or arch of the foot when the insole is attached to a somewhat flexible unit sole structure. The steel shank can be frictionally fitted into such a cavity or held in place with an adhesive prior to assembly on a flexible unit sole.

While the above specification describes the preferred form of my invention, it is possible that modifications thereof may occur to those skilled in the art that will fall within the scope of the following claims.

I claim:

1. An injection mold for making plastic insoles designed to have a specific thickness and quite irregular configuration adapting it for attachment to unit sole structures and the ends of vamp and heel means for a pair of shoes, comprising a pressure containing mold means which includes a first platen and a second platen moveable relatively toward each other to close the mold means and being adapted to contain a plastic molding pressure, and away from each other to an open position to permit a molded insole to be removed from the mold means, a base plate, a first apertured mold sheet having substantially planar surfaces adapted to be fixedly secured in a precise position relative to said base plate and a second apertured mold sheet having substantially planar surfaces adapted to be secured in a precise position relative to said first sheet, the peripheries of said apertures in each of said first and second mold plates coinciding to form the peripheries of the insoles produced therein, said first mold sheet having integral land means extending inwardly into its aperture to form recesses to receive the ends of said vamp and heel means, said platens holding said base plate and apertured mold sheets in a juxtaposed position when said mold means is closed whereby they cooperate to provide a mold cavity, means to feed a plastic to be molded into the mold cavity thus provided, and the combined thickness of said apertured mold sheets being equal to the designed thickness of an insole, and the molded insole being removed from between said platens when they are moved to said open position.

2. The injection mold of claim 1 wherein said land means integral with said first mold sheet includes a plurality of lands extending inwardly into the aperture formed therein.

3. The injection mold of claim 2 wherein said lands have an apex of a given length at the perimeter that defines the aperture in said second sheet and a base spaced inwardly from said perimeter that is longer than said given length.

4. The injection mold of claim 2 wherein individual ones of said unit sole structures are adapted to fit the right and left feet of a person and said first and second mold sheets both have tops and bottoms and are adapted to coordinate one with another when their bottoms are juxtaposed when the platens are closed to form an insole for attachment to one of either a right or left handed one of said pair of unit sole structures and after the platens have been opened and said first and second mold sheets each separately turned over and then reassembled together on the base plate and the platens are again closed to form another insole for attachment to the other of said pair of right or left handed unit sole structures when said tops of the sheets are in juxtaposed position.

5. The injection mold of claim 4 wherein each one of the unit sole structures has an upper surface with placement hole means therein and said base sheet for cooperating with the first mold sheet has aperture means therein to form precisely cast locating pin means on the cast insole that are adapted to coordinate with said hole means in the unit shoe structure to precisely position said insole relative to said unit shoe structure when said insole is attached thereto.

* * * * *